United States Patent
Wang

(10) Patent No.: US 6,836,948 B2
(45) Date of Patent: Jan. 4, 2005

(54) METHOD OF JOINING A SHEET METAL PART TO A METAL TUBE

(75) Inventor: Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 170 days.

(21) Appl. No.: 10/359,020

(22) Filed: Feb. 5, 2003

(65) Prior Publication Data

US 2004/0148760 A1 Aug. 5, 2004

(51) Int. Cl.[7] .................................................. B23P 11/00
(52) U.S. Cl. ........................ 29/432.1; 29/432.2; 29/509; 29/524.1; 29/525.06; 29/525.14; 29/798; 29/243.53; 219/157; 411/179; 411/181; 411/501
(58) Field of Search ............................... 219/161, 91.23, 219/117.1, 78.01, 78.16, 157; 411/179, 180, 181, 501; 29/897.2, 432.1, 432.2, 505, 509, 521, 522.1, 524.1, 525.05, 525.06, 525.14, 798, 243.5, 243.53

(56) References Cited

U.S. PATENT DOCUMENTS

| | | | | |
|---|---|---|---|---|
| 1,382,906 A | * | 6/1921 | Gravell | 411/504 |
| 1,691,522 A | * | 11/1928 | Kobert | 219/150 V |
| 3,524,042 A | | 8/1970 | Bennett | |
| 3,878,356 A | * | 4/1975 | Roye | 219/150 V |
| 4,037,073 A | * | 7/1977 | Becker | 219/92 |
| 5,752,305 A | | 5/1998 | Cotterill et al. | |
| 5,828,028 A | * | 10/1998 | Cecil | 219/110 |
| 5,957,777 A | | 9/1999 | Singh et al. | |
| 6,417,490 B1 | * | 7/2002 | Liebrecht et al. | 219/157 |
| 6,742,235 B2 | * | 6/2004 | Blacket et al. | 29/432.2 |

FOREIGN PATENT DOCUMENTS

| | | | | |
|---|---|---|---|---|
| JP | 11033664 A | * | 2/1999 | B21J/15/14 |
| WO | WO 98/01679 | | 1/1998 | |

* cited by examiner

Primary Examiner—David P. Bryant
Assistant Examiner—Jermie E. Cozart
(74) Attorney, Agent, or Firm—Kathryn A. Marra

(57) ABSTRACT

The present invention provides a method of joining a sheet metal part to a metal tube to form an assembly. In an overlapping configuration, the parts are held together under a clamping force while a self-piercing rivet is driven through the assembly by a welding electrode. The rivet pierces and passes through the sheet metal part and then through at least substantial portion of the metal tube to thereby form a mechanical interlock. An electrical current is then applied to this mechanical retention to melt a portion of the rivet as well as a portion of the metal surrounding the joining region. The flow of electrical current is then stopped after several welding cycles where the now melted material is allowed to solidify upon cooling, thereby forming a weld.

5 Claims, 1 Drawing Sheet

METHOD OF JOINING A SHEET METAL PART TO A METAL TUBE

TECHNICAL FIELD

This invention relates to a method of joining a sheet metal part to a surface of a metal tube. More specifically, the invention relates to a joining method in which the sheet metal is initially staked to the tube using a penetrating metal fastener and then a welding current is momentarily passed through the fastener and tube to fuse the embedded fastener to the sheet and tube.

BACKGROUND OF THE INVENTION

Shaped metal tubes are desirable for use in automotive body assemblies due to their strength and relatively low weight. In constructing automotive body assemblies that use bent, hydroformed tubes or the like, it is sometimes necessary to join a sheet metal body member to such a tube. However, it is often difficult to use traditional spot welding, riveting, or bolting practices to make sheet-to-tube assemblies.

Thus, it is an object of the present invention to provide a method of joining a tubular part to a sheet metal part with a flat attachment location for an automotive body assembly or the like. It is a further object of the present invention to provide a method of joining a tubular part to a flat part where the joint is robust and will contribute to the structural integrity of the assembly.

SUMMARY OF THE INVENTION

This invention is applicable to joining a sheet metal part having a relatively flat attachment surface to a surface of a metal tube. A suitable fixture may be provided to hold the attachment surface of the sheet metal part against the tube, especially when the joining operation is to be repeated like, for example, in a vehicle body manufacturing line.

The joining operation comprises initially staking the sheet metal part to the tube with a self-piercing rivet or the like. The shank of the rivet or other staking connector is driven through the sheet metal part into the wall of the tube. Preferably, the shank of the rivet is a hollow cylinder with a tapered, sharpened end for penetrating the sheet metal thickness and the wall of the tube. The head of the rivet is driven against the outer surface of the sheet metal part and the shank of the rivet penetrates well into the wall of the tube, or even through it. But since the tube is normally an elongated body, there is no access to the buried end of the rivet shank to form it over against the inside of the tube wall to secure a riveted joint. In accordance with the invention, the rivet is permanently secured in the sheet metal and tube by passing an electrical current through the rivet and tube to fuse the rivet to the surrounding sheet and tube metal.

The fusing step is carried out by applying one electrode against the head of the rivet and an opposing electrode against the opposite wall of the tube. A suitable high amperage electrical current, which is like a welding current, is passed between the electrodes. This current is suitably a 60 Hz alternating current or a rectified 60 Hz alternating current and the electrodes are best made of copper or a copper alloy. The welding current passes between the electrodes around the local circumference of the tube and through the rivet and adjoining material of the sheet metal part. The presence of small gaps between the rivet and the surrounding sheet metal and metal tube provide relatively high electrical resistance to the current. The metal at the respective gaps is rapidly heated and fused. After several cycles of the 60 Hz current, the electrical current is stopped. A nugget of fused material between the rivet, sheet metal part, and tube secures the initially staked, mechanical joint. Of course, more than one such joint may be required to securely join a given sheet metal part to a tube.

In a preferred embodiment of the invention, the electrode for contact with the rivet head is used like a hammer to drive the rivet through the sheet metal part into the tube wall, and the counter-electrode on the opposite side of the tube is used like an anvil to hold the tube against the impact of the self-piercing rivet. The counter-electrode is shaped, if necessary, to conform to a contour in the tube wall so as to better serve both the anvil function and electrical contact function of that electrode.

An advantage of the subject joining process is that much of the joining effort is applied from the outside of the sheet metal part and only the anvil/counter electrode need be brought into contact with the diametrically opposite side of the tube. Many of the sheet metal parts and tubes to be joined in automotive body construction are of complex shape and full two-sided access to the surfaces of the parts at the joining location may be difficult.

These and other objects and advantages of this invention will become apparent from a detailed description of the preferred embodiment that follows.

DESCRIPTION OF THE PREFERRED EMBODIMENT

The present invention provides a method of joining a metal tube to a sheet metal part such as for use in automotive body assemblies. The method of this invention uses features of self-piercing riveting practices and resistance spot welding methods to provide an improved method for joining a tube with only single-sided access to the joining location. The practice of the invention will be illustrated using a flat portion of a sheet metal part and a square tube but the subject process is applicable to round tubes and the like. Sheet metal parts of complex shape with a flattened portion for joining to the tube are applicable as well.

Figure 2:
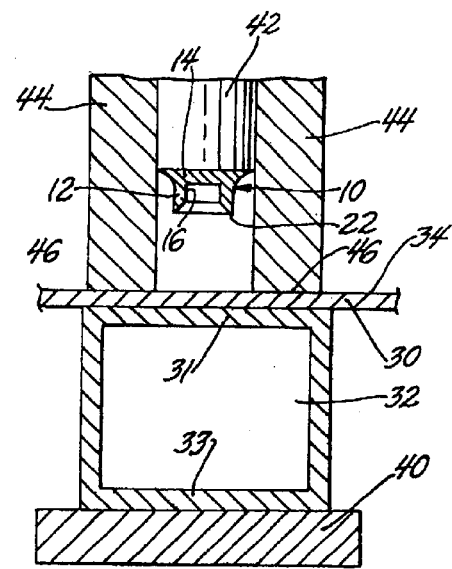
FIG. 2 is a side view, partially in cross-section, showing the clamping stage of the present invention where the sheet and tube are secured for joining.
Figure 3:
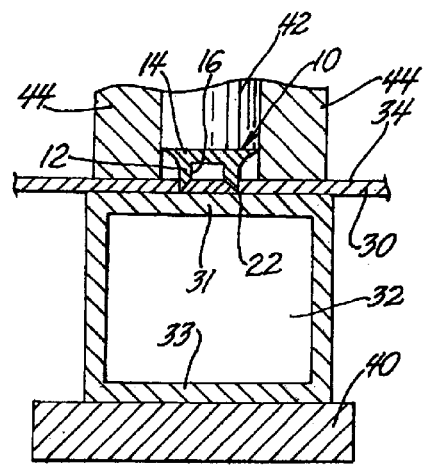
FIG. 3 is a side view, partially in cross-section, showing the self piercing rivet being driven through the sheet metal part into the tube in accordance with the present invention.
Figure 4:
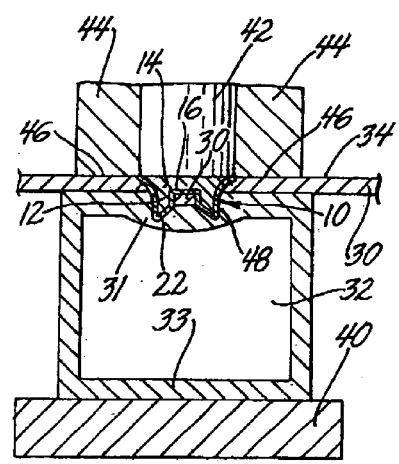
FIG. 4 is a side view, partially in cross section, showing the completed riveting process and the application of electrical current to weld and secure the riveted sheet-to-tube joint.

The present invention is sequentially shown in FIGS. 2–4. The tooling shown in these Figures, however, is not necessarily drawn to scale. The Figures represent idealized views of the joining process for purposes of illustration.

Starting with FIG. 2, a joint is to be made between a flat portion of a generic sheet metal part 30 and upper side wall 31 of a tubular part 32 that is square in cross-section. The flat portion of the sheet metal part 30 is placed against a wall surface of the tubular part 32 at a predetermined joining location. These parts are then held together, under a clamping force, to maintain positioning of the parts during the joining operation. In this process a riveting step and a fusion step are used. Accordingly, tools used in the riveting and welding may be used in the clamping. Thus, in FIG. 2, for example, a round, hollow cylinder 44 is used to apply the clamping force. The flat end 46 of cylinder 44 presses against the upper flat surface 34 of sheet metal part 30. As will be seen, cylinder 44 will be used in the riveting step of the process. A clamping force is also applied to the opposite side wall 33 of tube 32. In this case, the clamping force is applied by a copper slab, or back-up, which serves as a counter-electrode 40 in a subsequent welding step.

Figure 1:
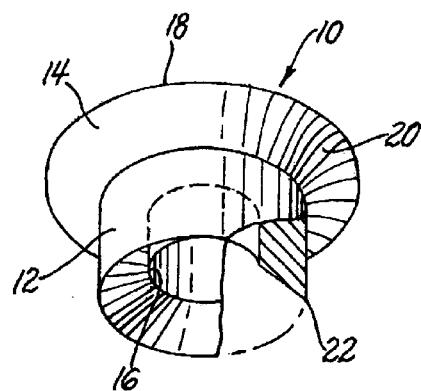
FIG. 1 is a tilted, side view, partly in cross-section of a self-piercing rivet having a hollow tapered piercing shank adapted to penetrate a sheet metal part and the wall of a tubular part.

While subjected to the clamping force, the tubular part 32 is initially mechanically joined to the sheet metal part 30 by means of self-piercing riveting. Any suitable self-piercing fastener will be suitable in practicing the present invention. For purposes of illustration, a self-piercing rivet in describing this invention is shown in FIG. 1. An example of a suitable self-piercing rivet 10 is shown in FIG. 1. Self-piercing rivet 10 comprises a round hollow shank 12 and a flat rivet head 14. Thus, axially extending through shank 12 is a central hole 16, which defines the inner surface of shank 12. Shank 12 terminates in a tapered sharpened edge 22 for piercing the sheet metal part 30 and wall 31 of tube 32. Piercing edge 22 is suitably hardened to penetrate metal.

At the opposite end of hollow shank 12 is flat rivet head 14 that provides an impact surface for driving rivet 10 into the sheet metal part 30. Specifically, rivet head 14 is a flat-headed, annular flange where its top surface 18 comprises a diameter that is significantly larger than shank 12. Below top surface 18, head 14 circumferentially tapers into shank 12. Tapered surface 20 permits rivet 10 to be driven into the sheet metal part 30 until top surface 18 lies smoothly against part surface 34 (as shown in FIG. 4).

The first step of this joining method comprises driving self-piercing rivet 10 through sheet metal part 30 and through at least a substantial portion of wall 31 of tubular part 32 to temporarily stake the parts together. This rivet driving step can be accomplished by any suitable means. However, since the rivet piercing step is to be followed by a welding step, it may be preferred to combine tooling for the two steps. For example, welding electrode 42, shown in a broken away illustration in FIGS. 2–4, may be used to hammer or drive rivet 10 through the metal layers.

For the riveting step, cylinder 44 is sized to accommodate the round head 14 of rivet 10. Welding electrode 42, with a flat tip for hammering, is sized to the diameter of rivet head 14 can slide axially up and down in cylinder 44. Cylinder 44 helps to locate rivet 10 on the joining portion of sheet metal part 30 and to keep it aligned as it is being driven into surface 34. It also provides suitable clamping force on the assembled parts for the joining operation. Also, welding electrode 40 is shaped to fit closely against wall 33 to hold tubular part 32 against sheet metal part 30 and for good electrical contact with wall 33.

As shown in FIG. 3, rivet 10 is then driven into the sheet metal part 30 using electrode 42 as a rivet punch. Upon sudden and forceful impact of electrode 42 against rivet head 14, piercing edge 22 will engage and penetrate top surface 34 of sheet 30. Thus, rivet 10 forms its own aperture. As shown in FIG. 4, rivet 10 is pushed through sheet 30 and into tube 32 until rivet head 14 is flush with top surface 34 of sheet metal part 30. Rivet 10 is driven into sheet 30 under a high rate and impact so that it will penetrate the sheet without significantly deforming it. The sheet metal 30 and tube 32 may deform inwardly from the impact of the rivet 10 as seen in FIG. 4. FIG. 4 illustrates the situation in which the inserted rivet 10 has pierced the sheet metal 30 without bending it and has bent the metal tube 32 inwardly. The rivet 10 has cut and retained a disk from the sheet metal part 30 and pushed in the tube wall 31. As seen, tube 32 protrudes slightly below hollow center 16 of shank 12 of the rivet 10. Sheet or tube material captured in hollow center 16 of rivet 10 may contribute to the weld layer as welding material. Thus, a mechanical attachment is formed between sheet 30 and tube 32.

The riveted, mechanical attachment is then secured using a resistance spot welding process. In this welding process, rivet 10 receives a pulse of high current flow from welding electrode 42 and copper slab 40, which acts as a counter electrode. A steady application of force is also supplied by clamping element 44 and copper slab 40. A pulse of high amperage AC (or rectified AC) current is directed through the facing electrodes 40, 42 to the joining location. Typically a 60 Hertz welding current is applied for several cycles of electrical current application, which amounts to less than a second of applied electrical current. Resistance to the electrical current by rivet 10 and surrounding metal of sheet 30 and tube 32 generates heat in the flow path of the current, thereby causing the metal located at the joining location to melt as well as a substantial portion of shank 12 of rivet 10. Depending on the materials used for sheet 30 and tube 32, the material for rivet 10 should be selected such that it has a higher resistance to electrical current than the sheet 30 and tube 32 materials. As such, that rivet 10 will contribute mostly to welding material for the joint. Rivet 10 will then weld with the surrounding metal of sheet 30 and tube 32. Upon cooling, the molten metal solidifies to form weld nugget 48.

The method of the present invention allows a secure and strong mechanical bond and weld to be formed between a sheet metal part and a tubular part, where the tubular part may be bent and/or hydroformed. Such tubular parts are difficult to join with other metallic parts because tooling cannot reach the inside of the tube, but the method of the present invention overcomes this difficulty. In a preferred embodiment, the electrode tooling is used to clamp the pieces together, drive the rivet into the parts and weld the rivet to the parts. Such consolidation of the duties of specific pieces of equipment allows the joining process to be economically and efficiently advantageous in vehicle fabrication, and specifically in automotive body assembly processes.

While the invention has been described in terms of a preferred embodiment, it is not intended to be limited to that description, but rather only to the extent of the following claims.

What is claim is:

1. A method of joining a sheet metal part to a metal tube, said method comprising the steps of:

placing said sheet metal part against a first surface of said metal tube at a predetermined joining location;

driving a self-piercing metal rivet through said sheet metal part and into said tube to mechanically attach said sheet metal part to said tube at said joining location;

passing an electrical current through said rivet and said tube at said joining location to fuse metal at interfaces of said rivet with said sheet and tube; and stopping the flow of electrical current to solidify the fused metal and form a welded bond between said rivet, sheet metal and tube.

2. The method as recited in claim 1 comprising passing said electrical current by contacting said rivet with a first electrode and contacting said tube with a second electrode at a second surface opposite said joining location and using said electrodes to pass said current through said rivet and tube.

3. The method as recited in claim 1 comprising engaging said sheet metal part at said joining location with an electrode assembly comprising a first electrode and a hollow cylindrical electrode tool, said tool being adapted to encompass said rivet and said first electrode and to exert a clamping force on said sheet metal part;

engaging a tube at a second surface with a second electrode adapted to conform to said second surface for clamping and electrical contact; and using said electrodes to pass said current through said rivet and tube, said current flowing around said tube from said second surface to said joining location located at said interface.

4. The method as recited in claim 1 comprising engaging said sheet metal part at said joining location with an electrode assembly comprising a first electrode and a hollow cylindrical electrode tool, said tool being adapted to encompass said rivet and said first electrode and to exert a clamping force on said sheet metal part;

engaging a tube at a second surface with a second electrode adapted to conform to said second surface for clamping and electrical contact;

placing said rivet in said electrode tool and driving said rivet into said sheet metal part and said tube with said first electrode; and using said electrodes to pass said current through said rivet and tube.

5. A method of joining a sheet metal part to a metal tube, said method comprising the steps of:

pressing said sheet metal part against the surface of said metal tube at a predetermining joining location using a first electrode assembly to press against said sheet metal part and a second electrode against the opposite side of said tube;

driving a self-piercing metal rivet through said sheet metal part using said first electrode and through at least a substantial portion of a wall of said metal tube at said joining location to mechanically attach said sheet metal part to said tube; and passing an electrical current through said electrodes, rivet and tube at said joining location to fuse said rivet to said sheet metal part and tube; and stopping the flow of electrical current to form a welded bond between said rivet, sheet metal part and tube.

* * * * *